United States Patent
Kim et al.

(10) Patent No.: US 10,023,769 B2
(45) Date of Patent: Jul. 17, 2018

(54) METHOD FOR PREPARING HOT-MELT ADHESIVE COMPOSITION AND HOT-MELT ADHESIVE COMPOSITION PREPARED THEREBY

(71) Applicants: HYUNDAI MOBIS CO., LTD., Seoul (KR); OKONG CORPORATION, Incheon (KR)

(72) Inventors: Seong Ho Kim, Suwon-si (KR); Jung Hwan Lee, Yongin-si (KR); Woo Sik Lee, Yongin-si (KR); In Oh Hong, Incheon (KR); Jong Il Park, Incheon (KR)

(73) Assignees: HYUNDAI MOBIS CO., LTD., Seoul (KR); OKONG CORPORATION, Incheon (KR)

( * ) Notice: Subject to any disclaimer, the term of this patent is extended or adjusted under 35 U.S.C. 154(b) by 88 days.

(21) Appl. No.: 15/007,036

(22) Filed: Jan. 26, 2016

(65) Prior Publication Data

US 2016/0369134 A1    Dec. 22, 2016

(30) Foreign Application Priority Data

Jun. 19, 2015    (KR) ........................ 10-2015-0087222

(51) Int. Cl.
```
C09J 123/16    (2006.01)
C08L 21/00     (2006.01)
C08L 23/16     (2006.01)
C08L 51/06     (2006.01)
C08L 53/02     (2006.01)
```

(52) U.S. Cl.
CPC ............ *C09J 123/16* (2013.01); *C08L 21/00* (2013.01); *C08L 23/16* (2013.01); *C08L 51/06* (2013.01); *C08L 53/02* (2013.01); *C08L 2205/035* (2013.01); *C08L 2312/00* (2013.01)

(58) Field of Classification Search
CPC ...... C09J 123/16; C09J 123/22; C09J 119/00; C08L 2666/06; C08L 23/16; C08L 23/0815; C08L 2205/02

USPC ......................................................... 524/271
See application file for complete search history.

(56) References Cited

FOREIGN PATENT DOCUMENTS

| CN | 102504735 A  |   | 6/2012  |
|----|--------------|---|---------|
| CN | 102618211 A  | * | 8/2012  |
| DE | 10316617 A1  |   | 11/2004 |
| JP | 2007-332279 A |  | 12/2007 |
| JP | 2011195797 A | * | 10/2011 |
| KR | 2001-0016861 A |  | 3/2001 |

OTHER PUBLICATIONS

JP2011-195797A—machine translation.*
CN102618211A—machine translation.*
Office Action dated Nov. 23, 2017 in corresponding German Application No. 10 2016 210 629.5 and its English translation—10 pages.

* cited by examiner

*Primary Examiner* — Ling Siu Choi
*Assistant Examiner* — Ronald Grinsted
(74) *Attorney, Agent, or Firm* — Knobbe Martens Olson & Bear LLP

(57) ABSTRACT

Disclosed is a method for preparing a hot-melt adhesive composition and a hot-melt adhesive composition prepared thereby. The method comprises: preparing and mixing raw materials, including a butyl rubber, an ethylene propylene diene (EPDM) rubber, a styrene block copolymer, an amorphous poly-alpha-olefin (APAO) and a tackifier resin; and performing vacuum degassing of the mixed raw materials, wherein the styrene block copolymer comprises a styrene-isoprene-styrene (SIS) rubber. The hot-melt adhesive composition has high resistance in temperature cycles between low and high temperatures so as to maintain its physical properties, and thus has an excellent property of sealing a headlamp for a long period of time until the end of the lifespan of the headlamp. Also, the composition generates no gas in the sealed state of the headlamp, and thus does not create bubbles or voids and does not pose a water tightness problem.

5 Claims, 2 Drawing Sheets

METHOD FOR PREPARING HOT-MELT ADHESIVE COMPOSITION AND HOT-MELT ADHESIVE COMPOSITION PREPARED THEREBY

CROSS-REFERENCES TO RELATED APPLICATIONS

This application claims the benefit of Korean Patent Application No. 10-2015-0087222, filed Jun. 19, 2015 in the Korean Intellectual Property Office, the entire disclosures of which are incorporated herein by reference.

BACKGROUND

The present disclosure relates to a method for preparing a hot melt adhesive composition and a hot melt adhesive composition prepared thereby.

The rapid development of modern society has brought about the popularization of cars. In addition, with the development of science and technology, consumer preference for more diverse functional luxury cars has increased.

Keeping pace with this movement, the demand for automotive parts having various designs and functionalities has recently increased in order to provide luxury cars. In particular, there have been increased attempts to enhance the functionalities of car headlamps and the like in order to improve safety during running. Adhesive materials used in manufacturing the automotive parts, such as, car headlamps, may affect the functionalities of the automotive parts. The related technology directed to adhesive materials is disclosed in KR2001-0016861A and JP2007-332279A.

SUMMARY

An embodiment of the present invention relates to a method for preparing a hot-melt adhesive composition and a hot-melt adhesive composition prepared thereby, in which the hot-melt adhesive composition has high resistance in repeated temperature cycles between low and high temperatures so as to maintain its physical properties even at extremely low or high temperatures, and thus has an excellent property of sealing a headlamp for a long period of time until the end of the lifespan of the headlamp, and also generates no gas over a long period of time in the sealed state of the headlamp, and thus does not create bubbles or voids therein and does not pose a water tightness problem in that external water penetrates into the headlamp.

In one aspect, the present invention is directed to a method for preparing a hot-melt adhesive composition, the method comprising: mixing raw materials, including a butyl rubber, an ethylene propylene diene (EPDM) rubber, a styrene block copolymer, an amorphous poly-alpha-olefin (APAO) and a tackifier resin; and performing vacuum degassing of the mixed raw materials, wherein the styrene block copolymer comprises a styrene-isoprene-styrene (SIS) rubber.

The tackifier resin may include aliphatic petroleum resin, rosin ester, terpene resin and the like.

The tackifier resin may comprise about 35-65 wt % of aliphatic petroleum resin, about 15-35 wt % of rosin ester, and about 15-35 wt % of terpene resin.

The raw materials may further include a plasticizer containing polyisobutylene, a phenol-based antioxidant, a UV stabilizer and the like.

The raw materials may include: about 14.5-14.7 wt % of the butyl rubber; about 14.5-14.7 wt % of the ethylene propylene diene (EPDM) rubber; about 9.6-9.8 wt % of the styrene block copolymer; about 7.7-7.9 wt % of the amorphous poly-alpha-olefin (APAO); about 19.4-19.7 wt % of the aliphatic petroleum resin, about 9.6-9.9 wt % of the rosin ester, about 9.6-9.9 wt % of the terpene resin; about 9.6-9.9 wt % of the plasticizer containing polyisobutylene; about 2-4 wt % of maleic anhydride polypropylene; about 0.5-1 wt % of the phenol-based antioxidant; and about 0.1-0.5 wt % of the UV stabilizer.

The vacuum degassing may be performed using a vacuum pump at a temperature between about 150° C. and about 210° C. at a vacuum level of about 70-150 mmHg.

The vacuum degassing may be performed for about 3-10 hours.

In another aspect, the present invention is directed to a hot-melt adhesive composition prepared by the above-described method.

The hot-melt adhesive composition may be for sealing a car lamp.

The car lamp may be applied to headlights, car indoor lights, door scarfs, rear lights and the like.

DESCRIPTION OF EMBODIMENTS

Figure 1A:
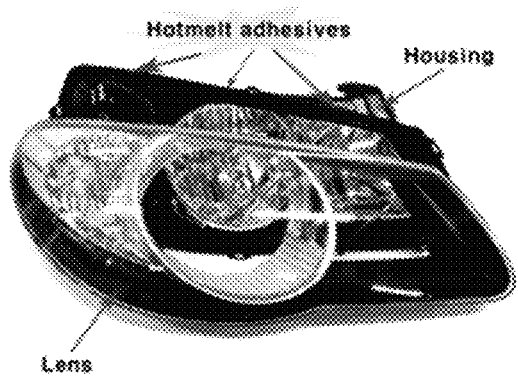
FIG. 1A shows an image of the external structure of a car headlamp.

Hereinafter, embodiments of the present invention will be described with reference to accompanying drawings. However, the embodiments are for illustrative purposes only and are not intended to limit the scope of the invention.

Embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the drawings, the thickness of lines or the size of constituent elements may be illustrated exaggeratingly for the clarity and convenience of description.

Although only a portion of a constituent element may be shown for the convenience of description, any person skilled in the art can easily understand the remaining portion of the constituent element. The description of the drawings is based on the viewpoint of the observer, and it will be understood that when one element is referred to as being "on" or "under" another element, it can be directly on or under the other element, or one or more intervening elements may also be present between these elements. Any person skilled in the art can understand that the present invention may be embodied in a variety of different forms without departing from the technical idea of the present invention. Throughout the disclosure, like reference numerals refer to like parts throughout the various figures and embodiments of the present invention.

It should be understood that singular expressions include plural expressions unless otherwise specified in the context thereof. In the specification, the terms "comprise", "have", etc., are intended to denote the existence of mentioned characteristics, numbers, steps, operations, components, parts, or combinations thereof, but do not exclude the probability of existence or addition of one or more other characteristics, numbers, steps, operations, components, parts, or combinations thereof.

In addition, the steps of a method or a preparation method may be performed in an order different from the mentioned sequence unless otherwise specified in the context thereof. In other words, the steps may be performed in the same order as the mentioned order, or performed substantially at the same time, or performed in an order opposite to the mentioned order.

Hereinafter, embodiments are described in further detail.

Figure 1B:
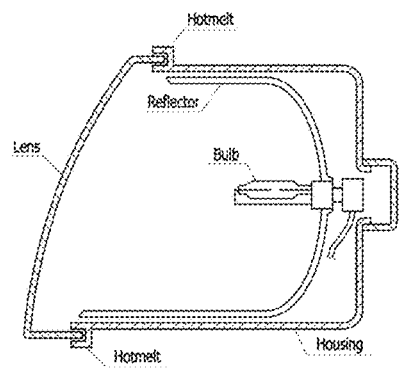
FIG. 1B is a schematic cross-sectional view showing the internal structure of the car headlamp.

FIG. 1A shows an image of the external structure of a car headlamp, and FIG. 1B is a schematic cross-sectional view showing the internal structure of the car headlamp.

Referring to FIGS. 1A and 1B, the car headlamp generally comprises a housing made of polypropylene and a lens made of polycarbonate, and can be manufactured by applying a hot-melt adhesive to the channel of the housing and then assembling the lens to the housing.

This hot-melt adhesive is a solvent-free adhesive, unlike solvent-based adhesives which are currently most frequently used in the industrial field, and has advantages in that it facilitates improvement in working environments and facilitates automated operations to reduce manpower required for operating processes. Due to such advantages, the hot-melt adhesive is of increasing importance.

Meanwhile, it may be required that a hot-melt adhesive in a car headlamp maintain its adhesion for 10 years or more even under temperature conditions such as high or low temperatures so as not to pose problems such as the penetration of external water.

The components of the car headlamp can be at a temperature ranging from—40° C. and 100° C. when the car runs or stops. In this wide temperature range, all the components of the headlamp should be maintained in a stable state.

If the hot-melt adhesive material is unstable, a temperature change during running of the car can create bubbles or voids through which water can penetrate into the headlamp. The penetrated water can be condensed, resulting in poor appearance quality or causing misoperation of electronic components sensitive to water. Thus, in embodiments, in order to avoid the occurrence of bubbles or voids in the headlamp-sealing hot-melt adhesive in the above-described temperature range, gas in the hot-melt adhesive material itself is removed during the preparation of the hot-melt adhesive.

Method for Preparation of Hot-Melt Adhesive Composition

In one aspect, the present invention is directed to a method for preparing a hot-melt adhesive composition, the method comprising: mixing raw materials, including a butyl rubber, an ethylene propylene diene (EPDM) rubber, a styrene block copolymer, an amorphous poly-alpha-olefin (APAO) and a tackifier resin; and performing vacuum degassing of the mixed raw materials, wherein the styrene block copolymer comprises a styrene-isoprene-styrene (SIS) rubber.

The hot-melt adhesive composition prepared according to the above method has high resistance in repeated temperature cycles between low and high temperatures so as to maintain its physical properties even at extremely low or high temperatures, and thus has an excellent property of sealing a headlamp for a long period of time until the end of the lifespan of the headlamp, and also generates no gas over a long period of time in the sealed state of the headlamp, and thus does not create bubbles or voids therein and does not pose a water tightness problem in that external water penetrates into the headlamp.

Hereinafter, a method for preparing a hot-melt adhesive composition according to embodiments of the present invention will be described in detail.

Figure 2:
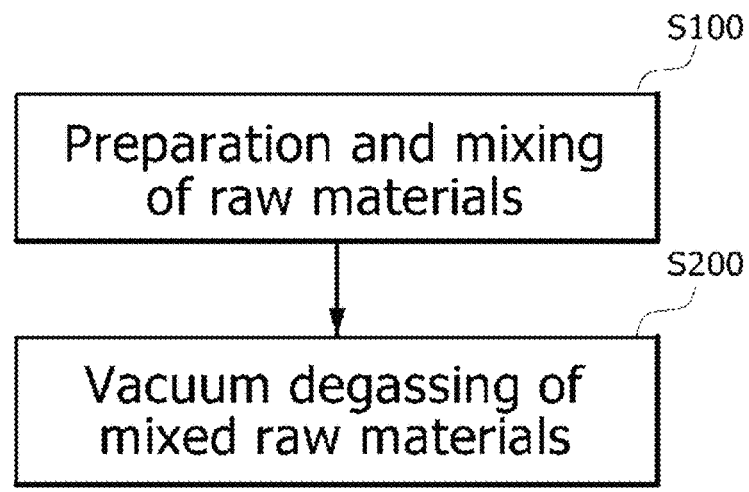
FIG. 2 is a process flow chart schematically showing a method for preparing a hot-melt adhesive composition according to an embodiment of the present invention.

FIG. 2 is a process flow chart schematically showing a method for preparing a hot-melt adhesive composition according to an embodiment of the present invention.

Referring to FIG. 2, the method for preparing the hot-melt adhesive composition according to embodiments of the present invention comprises the steps of: (S100) preparing and mixing raw materials; and (S200) performing vacuum degassing of the mixed raw materials.

Preparation and Mixing of Raw Materials

Step (S100) of preparing and mixing raw materials may be performed for the purpose of preparing and mixing resin components required for preparing the hot-melt adhesive composition.

The raw materials include a butyl rubber, an ethylene propylene diene (EPDM) rubber, a styrene block copolymer, an amorphous poly-alpha-olefin (APAO) and a tackifier resin, wherein the styrene block copolymer comprises a styrene-isoprene-styrene (SIS) rubber.

Butyl Rubber

The butyl rubber is highly resistant to weather changes, is strongly resistant to heat or ozone oxidizers due to its low unsaturated bond content, has excellent electrical insulation properties, and is also used as an impact modifier because it easily absorbs impact. In embodiments of the present invention, the butyl resin is used for the purpose of increasing the adhesive strength and cold resistance of the hot-melt adhesive composition.

The butyl rubber may be contained in an amount of about 9.9-18.5 wt %, for example, about 10.5-17 wt %, for example, 12-15 wt %, based on 100 wt % of the total weight of the hot-melt adhesive composition. If the content of the butyl rubber in the hot-melt adhesive composition is lower than about 9.9 wt %, the effect of the butyl rubber in the composition according to embodiments of the present invention will be insignificant, and if the content of the butyl rubber is higher than about 18.5 wt %, the viscosity of the composition will increase to reduce the workability of the composition.

Ethylene Propylene Diene Rubber

The ethylene propylene diene (EPDM) rubber is a non-polar rubber material containing no double bond in its main chain, and has good aging resistance, good ozone resistance, good resistance to polar liquid, and good electrical properties, and is used in electric wire covers, automotive hoses, steam hoses, conveyor belts, etc. In embodiments of the present invention, the ethylene propylene diene rubber is used for the purpose of increasing reactivity during the formation of the composition.

The ethylene propylene diene rubber may be contained in an amount of about 9.9-18.5 wt %, for example, about 10.5-17 wt %, for example, 12-15 wt %, based on 100 wt % of the total weight of the hot-melt adhesive composition. If the content of the ethylene propylene diene rubber in the composition is lower than 9.9 wt %, the effect of the ethylene propylene diene rubber in the composition according to embodiments of the present invention will be significant, and if the content of the ethylene propylene diene rubber is higher than 18.5 wt %, the increase in the effect by the increased content will be insignificant, and thus an ethylene propylene diene rubber content higher than 18.5 wt % is not cost-effective.

Styrene Block Copolymer

The styrene block copolymer comprises a styrene-isoprene-styrene (SIS) rubber, and is used for the purpose of improving the lightweight and flexible properties of the composition according to embodiments of the present invention to facilitate the handling of the composition.

The styrene block copolymer may be contained in an amount of about 6.6-12.4 wt %, for example, about 7.5-11 wt %, for example, about 9-10 wt %, based on 100 wt % of the total weight of the hot-melt adhesive composition according to embodiments of the present invention. If the content of the styrene block copolymer in the composition is lower than about 6.6 wt %, the effect of the styrene in the composition according to embodiments of the present invention will be insignificant, and if the content of the styrene block copolymer is higher than about 12.4 wt %, the flowability and physical properties of the hot-melt adhesive composition will be significantly reduced.

Amorphous Poly-Alpha-Olefin (APAO)

The amorphous poly-alpha-olefin (APAO) is used for the purpose of improving the adhesive strength, heat resistance and cold resistance of the hot-melt adhesive composition according to embodiments of the present invention.

The amorphous poly-alpha-olefin may be contained in an amount of about 5.3-9.9 wt %, for example, about 6-9 wt %, for example, about 7-8 wt %, based on 100 wt % of the total weight of the hot-melt adhesive composition according to embodiments of the present invention. If the content of the amorphous poly-alpha-olefin in the composition is lower than about 5.3 wt %, the effect of the amorphous poly-alpha-olefin in the composition according to embodiments of the present invention will be insignificant, and if the content of the amorphous poly-alpha-olefin is higher than about 9.9 wt %, the viscosity of the hot-melt adhesive composition according to embodiments of the present invention will increase to reduce the workability of the composition.

Tackifier Resin

The tackifier resin is used for the purpose of increasing the hot-melt adhesive composition according to embodiments of the present invention in combination with the above-described butyl rubber, ethylene propylene diene rubber, styrene block copolymer and amorphous poly-alpha-olefin.

The tackifier resin may be contained in an amount of about 27-49 wt %, for example, about 29-47 wt %, for example, about 31-45 wt %, based on 100 wt % of the total weight of the hot-melt adhesive composition according to embodiments of the present invention. If the content of the tackifier resin in the composition is lower than about 27 wt %, the effect of the tackifier resin in the composition according to embodiments of the present invention will be insignificant, and the content of the tackifier resin is higher than about 49 wt %, the hardness of the composition will increase and the adhesive property of the composition will decrease.

In other embodiments, the tackifier resin may comprise aliphatic petroleum resin, rosin ester, terpene resin and the like. In embodiments of the present invention, the tackifier resin may comprise aliphatic petroleum resin, rosin ester and terpene resin. For example, the tackifier resin may comprise about 35-65 wt % of aliphatic petroleum resin, about 15-35 wt % of rosin ester, and about 15-35 wt % of terpene resin. In the above-described content range, the tackifier resin has an advantage in that it can increase the adhesive property of the composition while suitably maintaining the hardness of the composition in combination with the above-described raw materials.

The raw materials may further include a plasticizer containing polyisobutylene, a phenol-based antioxidant, a UV stabilizer and the like.

Plasticizer Containing Polyisobutylene

The plasticizer containing polyisobutylene may be used for the purpose of imparting flexibility to the composition according to embodiments of the present invention and delaying the surface drying of the adhesive composition during use.

The plasticizer containing polyisobutylene may be contained in an amount of about 6.6-12.4 wt %, for example, about 7-12 wt %, for example, about 8-11 wt %, based on 100 wt % of the total weight of the hot-melt adhesive composition according to embodiments of the present invention. If the content of the plasticizer containing polyisobutylene in the composition is lower than about 6.6 wt %, and the effect of the plasticizer in the composition according to embodiments of the present invention will be insignificant, and if the content of the plasticizer containing polyisobutylene is higher than about 12.4 wt %, the flowability of the adhesive composition will undesirably increase and the adhesive strength of the composition will decrease.

Maleic Anhydride Polypropylene

The maleic anhydride polypropylene is prepared by graftpolymerizing maleic anhydride (MAH) having a hydrophilic functional group onto polypropylene resin, and may be used for the purpose of improving the adhesive strength, water tightness and gas barrier properties of the hot-melt adhesive composition according to embodiments of the present invention and uniformly dispersing each component of the composition during formation of the composition.

The maleic anhydride polypropylene may be contained in an amount of about 0.5-7 wt %, for example, about 1-6 wt %, for example, about 2-5 wt %, based on 100 wt % of the hot-melt adhesive composition according to embodiments of the present invention. If the content of the maleic anhydride polypropylene in the composition is lower than about 0.5 wt %, the effect of the maleic anhydride polypropylene in the composition according to embodiments of the present invention will be insignificant, and if the content of the maleic anhydride polypropylene is higher than about 7 wt %, it will be difficult to prepare a hot-melt adhesive composition having high heat resistance and adhesive strength.

Phenol-Based Antioxidant

The phenol-based antioxidant may be used for the purpose of improving the thermal stability of the hot-melt adhesive composition according to embodiments of the present invention.

The phenol-based antioxidant may be contained in an amount of about 0.5-2 wt %, for example, about 0.7-1.8 wt %, for example, about 1-1.5 wt %, based on 100 wt % of the hot-melt adhesive composition according to embodiments of the present invention. If the content of the phenol-based antioxidant in the composition is lower than about 0.5 wt %, the effect of the phenol-based antioxidant in the composition according to embodiments of the present invention will be insignificant, and if the content of the phenol-based antioxidant is higher than about 2 wt %, the increase in the effect by the increased content of the phenol-based antioxidant will be insignificant, and thus a phenol-based antioxidant content higher than about 2 wt % is not cost-effective.

UV Stabilizer

The UV stabilizer may be used for the purpose of preventing the color and physical properties of the hot-melt adhesive composition according to embodiments of the present invention from being changed by UV rays.

The UV stabilizer may be contained in an amount of about 0.1-0.7 wt %, for example, about 0.2-0.6 wt %, for example, about 0.3-0.5 wt %, based on 100 wt % of the hot-melt adhesive composition according to embodiments of the present invention. If the content of the UV stabilizer in the composition is lower than about 0.1 wt %, the effect of the UV stabilizer in the composition according to embodiments of the present invention will be insignificant, and if the content of the UV stabilizer is higher than about 0.7 wt %, the increase in the effect by the increased content of the UV stabilizer will be insignificant, and thus a UV stabilizer content higher than about 0.7 wt % is not cost-effective.

In an embodiment of the present invention, the raw materials may include: about 14.5-14.7 wt % of the butyl rubber; about 14.5-14.7 wt % of the ethylene propylene diene (EPDM) rubber; about 9.6-9.8 wt % of the styrene block copolymer comprising styrene-isoprene-styrene (SIS) rubber; about 7.7-7.9 wt % of the amorphous poly-alpha-olefin (APAO); about 19.4-19.7 wt % of aliphatic petroleum resin as the tackifier resin; about 9.6-9.9 wt % of rosin ester as the tackifier resin; about 9.6-9.9 wt % of terpene resin as the tackifier resin; about 9.6-9.9 wt % of the plasticizer containing polyisobutylene; about 2-4 wt % of the maleic anhydride polypropylene; about 0.5-1 wt % of the phenol-based antioxidant; and about 0.1-0.5 wt % of the UV stabilizer. In the above-described content ranges, the hot-melt adhesive composition according to embodiments of the present invention has high resistance in temperature cycles so as to maintain its physical properties, and thus has an excellent property of sealing a headlamp for a long period of time until the end of the lifespan of the headlamp, and also generates no gas over a long period of time, and thus does not create bubbles or voids therein and does not pose a water tightness problem.

Vacuum Degassing of Mixed Raw Materials

Step (S200) of performing vacuum degassing of the mixed raw materials may be performed for the purpose of degassing the mixed raw materials under a vacuum condition by means of a vacuum pump to thereby prevent the occurrence of bubbles or voids in a headlamp-sealing hot-melt composition even in repeated temperature cycles between high and low temperatures during preparation of the hot-melt composition and after assembly of the headlamp and eliminate a water tightness problem in that water penetrates into the headlamp.

The vacuum degassing may be performed using a water-sealed or oil-sealed vacuum pump, and may be performed at a temperature of about 150° C. to about 210° C., for example, about 160° C. to about 200° C., for example, about 170° C. to about 190° C. If the vacuum degassing is performed at a temperature lower than about 150° C., the effect of the vacuum degassing performed using the vacuum pump will be insignificant, and if the vacuum degassing is performed at a temperature higher than about 210° C., bubbles or voids will occur and the penetration of water will be frequent.

The vacuum degassing may be performed at a vacuum level of about 70-150 mmHg, for example, about 70-140 mmHg, for example, about 70-130 mmHg. If the vacuum degassing is performed at a vacuum level greater than about 70 mmHg and smaller than about 150 mmHg, the occurrence of bubbles and voids in a hot melt sealing a headlamp, the increase of the production cost of the hot-melt adhesive composition, the poor water tightness and the deterioration of headlamp sealing can be avoided, minimized or reduced.

The vacuum degassing may be performed for about 3-10 hours, for example, about 5-8 hours, for example, about 6-7 hours. If the vacuum degassing is performed for less than about 3 hours, bubbles and voids will occur in the hot-melt adhesive composition, and if the vacuum degassing is performed for more than about 10 hours, the production cost of the hot-melt adhesive composition will increase, and long-term maintenance of the headlamp-sealing property of the composition will be difficult, resulting in increases in gas generation and poor water tightness.

The hot-melt adhesive composition prepared by the above-described preparation method has high resistance in temperature cycles between low and high temperatures so as to maintain its physical properties even at extremely low or high temperatures, and thus has an excellent property of sealing a headlamp for a long period of time until the end of the lifespan of the headlamp, and also generates no gas over a long period of time in the sealed state of the headlamp, and thus does not create bubbles or voids therein and does not pose a water tightness problem in that external water penetrates into the headlamp.

Hot-Melt Adhesive Composition

In another aspect, the present invention is directed to a hot-melt adhesive composition prepared by the above-described method.

The hot-melt adhesive composition may be for sealing a car lamp.

The hot-melt adhesive composition may be applied to devices in various fields requiring hot-melt adhesives. Particularly, it may be applied to lamp devices, for example, car lamps, household lighting devices, industrial lighting devices, etc. Preferably, it may be used to seal a car lamp.

The car lamp may be applied in headlights, car indoor lights, door scarfs and rear lights. However, devices to which the car lamp are not specifically limited, as long as the car lamp is used to achieve the purpose of the present invention.

The hot-melt adhesive composition according to the present invention has high resistance in temperature cycles between low and high temperatures so as to maintain its physical properties even at extremely low or high temperatures, and thus has an excellent property of sealing a headlamp for a long period of time until the end of the lifespan of the headlamp, and also generates no gas over a long period of time in the sealed state of the headlamp, and thus does not create bubbles or voids therein and does not pose a water tightness problem in that external water penetrates into the headlamp.

Hereinafter, the present invention will be described in further detail with reference to examples. It is to be understood, however, that these examples are provided for a better understanding of the present invention and are not intended to limit the scope of the present invention. Contents that are not disclosed herein can be sufficiently understood by any person skilled in the art, and thus the description thereof will be omitted.

EXAMPLES

Example 1

As shown in Table 1 below, the following raw materials were mixed in a mixer: based on 100 wt % of the total weight of a hot-melt adhesive composition, 14.5 wt % of butyl rubber; 14.5 wt % of ethylene propylene diene (EPDM) rubber; 9.6 wt % of a styrene block copolymer comprising styrene-isoprene-styrene (SIS) rubber; 7.7 wt % of an amorphous poly-alpha-olefin (APAO); 19.4 wt % of aliphatic petroleum resin as a tackifier resin; 9.6 wt % of rosin ester as a tackifier resin; 9.6 wt % of terpene resin as a tackifier resin; 9.6 wt % of a plasticizer containing polyisobutylene; 4 wt % of maleic anhydride polypropylene; 1 wt % of a phenol-based antioxidant; and 0.5 wt % of a UV stabilizer. Next, vacuum degassing of the mixed raw materials was performed by means of a vacuum pump at a vacuum level of 80 mmHg at a temperature of 170° C. for 4 hours, thereby preparing a hot-melt adhesive composition according to embodiments of the present invention.

Next, 1.5 g of a hot-melt adhesive formed of the hot-melt adhesive composition was applied to a polypropylene (PP) sample (100 mm (width)×60 mm (length)×3 mm (thickness)), and then pressed with a transparent polycarbonate (PC) sample (100 mm (width)×60 mm (length)×3 mm (thickness)), thereby preparing an expandable sample having a hot-melt thickness of 1 mm and a hot-melt area of 3 cm$^2$.

Examples 2 to 4

Hot-melt adhesive compositions according to embodiments of the present invention were prepared in the same manner as described in Example 1, except that the compositions were prepared under the component, content and vacuum conditions shown in Table 1 below. Using the prepared compositions, expandable samples were prepared.

Comparative Example 1

A hot-melt adhesive composition was prepared in the same manner as described in Example 1, except that vacuum degassing was not performed and the composition was prepared using the contents of components shown in Table 1 below, which are within the content ranges used in the Examples. Using the prepared composition, an expandable sample was prepared.

Comparative Example 2

A hot-melt adhesive composition was prepared in the same manner as described in Example 1 under vacuum degassing conditions which are within the ranges used in the Examples, except that the composition was prepared using the contents of components shown in Table 1 below, which are out of the content ranges used in the Examples. Using the prepared composition, an expandable sample was prepared.

Comparative Example 3

A hot-melt adhesive composition was prepared in the same manner as described in Example 1, except that vacuum degassing was not performed and the composition was prepared using the contents of components shown in Table 1 below, which are out of the content ranges used in the Example. Using the prepared composition, an expandable sample was prepared.

Comparative Example 4

A hot-melt adhesive composition was prepared in the same manner as described in Example 1, except that vacuum degassing was performed under conditions out of the ranges used in the Examples and the composition was prepared using the contents of components shown in Table 1 below, which are out of the content ranges used in the Examples. Using the prepared composition, an expandable sample was prepared.

TABLE 1

|  |  | Ex. 1 | Ex. 2 | Ex. 3 | Ex. 4 | Comp. Ex. 1 | Comp. Ex. 2 | Comp. Ex. 3 | Comp. Ex. 4 |
| --- | --- | --- | --- | --- | --- | --- | --- | --- | --- |
| Components (wt %) | Butyl rubber | 14.5 | 14.6 | 14.7 | 14.6 | 14.5 | 20 | 20 | 15 |
|  | EPDM | 14.5 | 14.6 | 14.7 | 14.6 | 14.5 | 5 | 5 | 15 |
|  | SIS | 9.6 | 9.8 | 9.8 | 9.8 | 9.6 | 1 | 1 | 10 |
|  | APAO | 7.7 | 7.8 | 7.9 | 7.8 | 7.7 | 9 | 9 | 8 |
|  | Aliphatic petroleum resin | 19.4 | 19.6 | 19.7 | 19.6 | 19.4 | 15 | 15 | 20 |
|  | Rosin ester | 9.6 | 9.7 | 9.9 | 9.7 | 9.6 | 26.5 | 26.5 | 10 |
|  | Terpene resin | 9.6 | 9.7 | 9.9 | 9.7 | 9.6 | 15 | 15 | 10 |
|  | PIB | 9.6 | 9.7 | 9.9 | 9.7 | 9.6 | 5 | 5 | 10 |
|  | Maleic anhydride polypropylene | 4 | 3 | 2 | 3 | 4 | 2 | 2 | 0.5 |
|  | Antioxidant | 1 | 1 | 1 | 1 | 1 | 1 | 1 | 1 |
|  | UV stabilizer | 0.5 | 0.5 | 0.5 | 0.5 | 0.5 | 0.5 | 0.5 | 0.5 |
|  | Total content (wt %) | 100 | 100 | 100 | 100 | 100 | 100 | 100 | 100 |
| Vacuum degassing | Vacuum level (mmHg) | 80 | 90 | 70 | 100 | — | 70 | — | 50 |
|  | Vacuum degassing time | 4 | 3 | 5 | 4 | — | 5 | — | 2 |
|  | Temperature (° C.) | 170 | 160 | 150 | 200 | — | 150 | — | 150 |

Test Example

In order to examine whether voids and bubbles occur in the expandable samples prepared in Examples 1 to 4 and Comparative Examples 1 to 3 and whether water penetrates into the expandable samples, the measurement of physical properties was performed as follows. The results of the measurement are shown in Table 2 below.

(1) Occurrence of Bubbles and Voids and Penetration of Water

The prepared expandable samples were allowed to stand at room temperature for 24 hours or more, and then subjected to four cycles in a constant temperature & humidity chamber, each of the cycles consisting of 4 hours at 100° C., 4 hours at −40° C., and 4 hours at 50° C. and a humidity of 90%. Next, the samples were allowed to stand at room temperature for 1 hour or more, and then whether bubbles and voids occurred in an area of 1 cm² on the surface of the hot melt and whether water penetrated were observed.

TABLE 2

|  | Example 1 | Example 2 | Example 3 | Example 4 | Comp. Example 1 | Comp. Example 2 | Comp. Example 3 | Comp. Example 4 |
|---|---|---|---|---|---|---|---|---|
| Occurrence of voids | x | x | x | x | ○ | ○ | ○ | ○ |
| Occurrence of bubbles | x | x | x | x | ○ | Δ | ○ | ○ |
| Water penetration | x | x | x | x | ○ | ○ | Δ | ○ |

Results of Evaluation of Physical Properties

Figure 3:
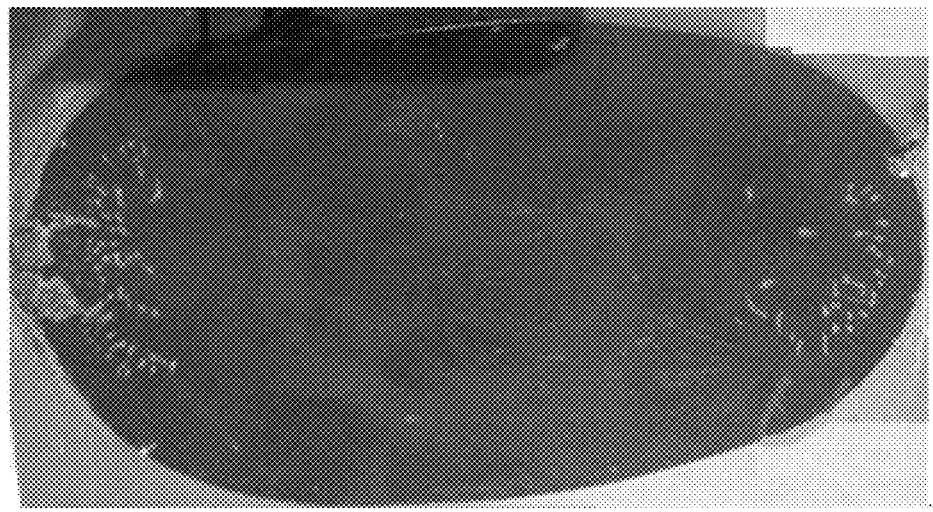
FIG. 3 is a photograph showing the appearance of an expandable sample sealed with a hot-melt adhesive according to Comparative Example 1.
Figure 4A:
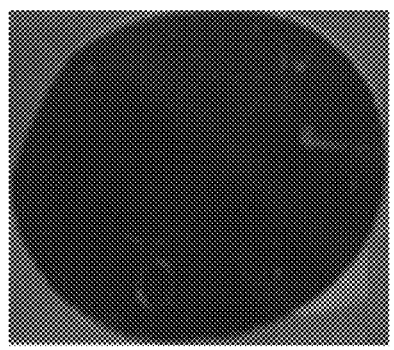
FIGS. 4A to 4D are photographs showing the appearance of expandable samples sealed with hot-melt adhesives according to Examples 1 to 4 of the present invention, respectively.
Figure 4B:
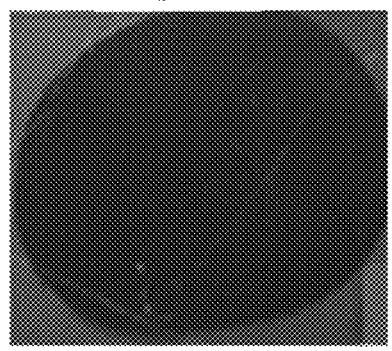
Figure 4C:
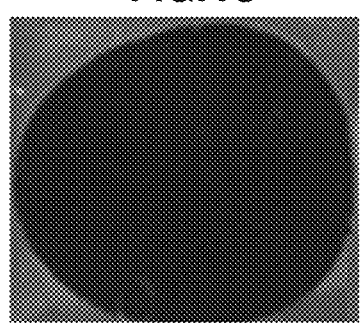
Figure 4D:
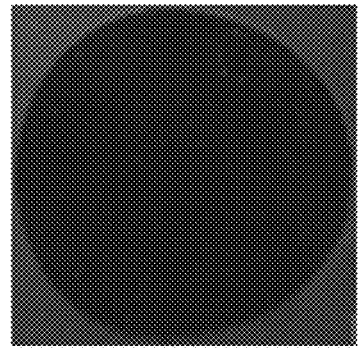

FIG. 3 is a photograph showing the expandable sample sealed with the hot-melt adhesive according to Comparative Example 1 of the present invention.

Referring to FIG. 3, it can be seen that, in the case in which the content of each component was within the range used in the Example, but vacuum degassing was not performed, a number of bubbles or voids were found on the surface of the expandable sample and water did penetrate into the sealed headlamp.

In addition, it can be seen that, in the case of Comparative Example 2 in which vacuum degassing was performed under conditions which are within the ranges used in the Example, but the sample was prepared using the content of each component, which is out of the range used in the Example, or the case of Comparative Example 3 in which vacuum degassing was not performed and the sample was prepared using the content of each component, which is out of the range used in the Example, or the case of Comparative Example 4 in which vacuum degassing was performed under conditions out of the ranges used in the Example and the sample was prepared using the content of each component, which is out of the range used in the Example, the occurrence of bubbles and voids in an area of 1 cm² on the hot-melt surface of the expandable sample was remarkable, and external water also did penetrate into the headlamp, indicating that a water tightness problem occurred.

Meanwhile, FIGS. 4A to 4D are photographs showing the appearance of the expandable samples sealed with the hot-melt adhesives according to Examples 1 to 4 of the present invention, respectively.

Referring to FIGS. 4A to 4D, it can be seen that, in the case of Examples 1 to 4 (corresponding to FIGS. 4A to 4D, respectively) in which the content of each component is in the numerical range having a specific critical significance and vacuum degassing was performed using the vacuum pump at a temperature of 150 to 210° C. at a vacuum level of 70-150 mmHg for 3-10 hours, excellent effects were achieved in that the hot-melt adhesive had an excellent property of sealing the headlamp over a long period of time until the end of the lifespan of the headlamp, and did not generate gas over a long period of time in the sealed state of the headlamp, and thus did not create bubbles and voids therein and did not pose a water tightness problem in that external water penetrates into headlamp.

As described above, the method for preparing the hot-melt adhesive composition according to the embodiment of the present invention comprises: preparing and mixing raw materials, including a butyl rubber, an ethylene propylene diene rubber, a styrene block copolymer, an amorphous poly-alpha olefin and a tackifier resin; and performing vacuum degassing of the mixed raw materials, wherein the styrene block copolymer comprises styrene-isoprene-styrene rubber. The hot-melt adhesive composition prepared by the above-described method has high resistance in temperature cycles between low and high temperatures so as to maintain its physical properties even at extremely low or high temperatures, and thus has an excellent property of sealing a headlamp over a long period of time until the end of the lifespan of the headlamp, and also generates no gas over a long period of time in the sealed state of the headlamp, and thus does not create bubbles or voids therein and does not pose a water tightness problem in that external water penetrates into the headlamp.

Embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method for preparing a hot-melt adhesive composition, the method comprising;
    mixing raw materials comprising a butyl rubber, an ethylene propylene diene (EPDM) rubber, a styrene block copolymer, an amorphous poly-alpha-olefin (APAO) and a tackifier resin; and
    performing vacuum degassing of the mixed raw materials, wherein the styrene block copolymer comprises a styrene-isoprene-styrene (SIS) rubber,
    wherein the vacuum degassing is performed using a vacuum pump at a temperature between about 150° C. and about 210° C. at a vacuum level of about 70-150 mmHg for about 3-10 hours.

2. The method of claim 1, wherein the tackifier resin is one or more selected from the group consisting of aliphatic petroleum resin, rosin ester and terpene resin.

3. The method of claim 2, wherein the tackifier resin comprises about 35-65 wt % of the aliphatic petroleum resin, about 15-35 wt % of the rosin ester, and about 15-35 wt % of the terpene resin.

4. The method of claim 1, wherein the raw materials further include a plasticizer containing polyisobutylerte, a phenol-based antioxidant, and a UV stabilizer.

5. The method of claim 1, wherein the raw materials comprise:
    about 1.4.5-14.7 wt % of the butyl rubber;
    about 14.5-14.7 wt % of the ethylene propylene diene (EPDM) rubber;
    about 9.6-9.8 wt % of the styrene block copolymer;
    about 7.7-7.9 wt % of the amorphous poly-alpha-olefin (APAO);
    about 19.4-19.7 wt % of aliphatic petroleum resin;
    about 9.6-9.9 wt % of rosin ester;
    about 9.6-9.9 wt % of terpene resin;

about 9.6-9.9 wt % of a plasticizer containing polyisobutylene;
about 2-4 wt % of maleic anhydride polypropylene;
about 0.5-1 wt % of a phenol-based antioxidant; and
about 0.1-0.5 wt % of a UV stabilizer.

* * * * *